(12) United States Patent
Del Fabro

(10) Patent No.: US 11,648,603 B2
(45) Date of Patent: May 16, 2023

(54) APPARATUS AND METHOD FOR HANDLING BARS

(71) Applicant: M.E.P. Macchine Elettroniche Piegatrici S.P.A., Reana del Rojale (IT)

(72) Inventor: Giorgio Del Fabro, Udine (IT)

(73) Assignee: M.E.P. MACCHINE ELETTRONICHE PIEGATRICI S.P.A., Reana del Rojale (IT)

(*) Notice: Subject to any disclaimer, the term of this patent is extended or adjusted under 35 U.S.C. 154(b) by 971 days.

(21) Appl. No.: 16/474,672

(22) PCT Filed: Dec. 21, 2017

(86) PCT No.: PCT/EP2017/084270
§ 371 (c)(1),
(2) Date: Jun. 28, 2019

(87) PCT Pub. No.: WO2018/122132
PCT Pub. Date: Jul. 5, 2018

(65) Prior Publication Data
US 2019/0321876 A1 Oct. 24, 2019

(30) Foreign Application Priority Data
Dec. 29, 2016 (IT) .................. 102016000132141

(51) Int. Cl.
*B21F 23/00* (2006.01)
*B21C 51/00* (2006.01)
(Continued)

(52) U.S. Cl.
CPC ............ *B21F 23/007* (2013.01); *B21C 51/00* (2013.01); *B65G 47/12* (2013.01); *B65G 47/1485* (2013.01); *B65G 57/186* (2013.01)

(58) Field of Classification Search
None
See application file for complete search history.

(56) References Cited

U.S. PATENT DOCUMENTS 3,712,458 A 1/1973 Elineau
6,808,359 B2 * 10/2004 Miglioranza ........ B21D 43/006
414/745.9
(Continued)

FOREIGN PATENT DOCUMENTS

DE 4035345 A1 5/1992
EP 0122883 A2 10/1984
(Continued)

OTHER PUBLICATIONS

Int'l Search Report and Written Opinion dated Mar. 28, 2018 in Int'l Application No. PCT/EP2017/084270.
(Continued)

*Primary Examiner* — William R Harp
(74) *Attorney, Agent, or Firm* — Panitch Schwarze Belisario & Nadel LLP

(57) ABSTRACT

Apparatus for handling bars (31), in particular metal bars, including a loading unit (22) provided with transporter elements (25) to transfer a series of bars (31) toward a selector unit (34); the selector unit (34) includes a gripping device (35) configured to remove one or more bars (31) from the transporter elements (25) of the loading unit (22) and to release them toward a subsequent collection station (43) and also includes sensors (41) configured to automatically detect at least the number of bars (31) removed and released by the gripping device (35) toward the collection station (43).

17 Claims, 10 Drawing Sheets

(51) Int. Cl.
*B65G 47/12* (2006.01)
*B65G 47/14* (2006.01)
*B65G 57/18* (2006.01)

(56) References Cited

U.S. PATENT DOCUMENTS 7,832,976 B2 * 11/2010 Miglioranza ......... B21F 23/007
　　　　　　　　　　　　　　　　　　　　414/801
2008/0078136 A1　　4/2008 Shinaut et al.

FOREIGN PATENT DOCUMENTS

| EP | 1375022 | A2 | 1/2004 |
| EP | 2412456 | A1 | 2/2012 |
| EP | 2878397 | A1 | 6/2015 |

OTHER PUBLICATIONS

Int'l Preliminary Report on Patentability dated Jan. 8, 2019 in Int'l Application No. PCT/EP2017/084270.

* cited by examiner

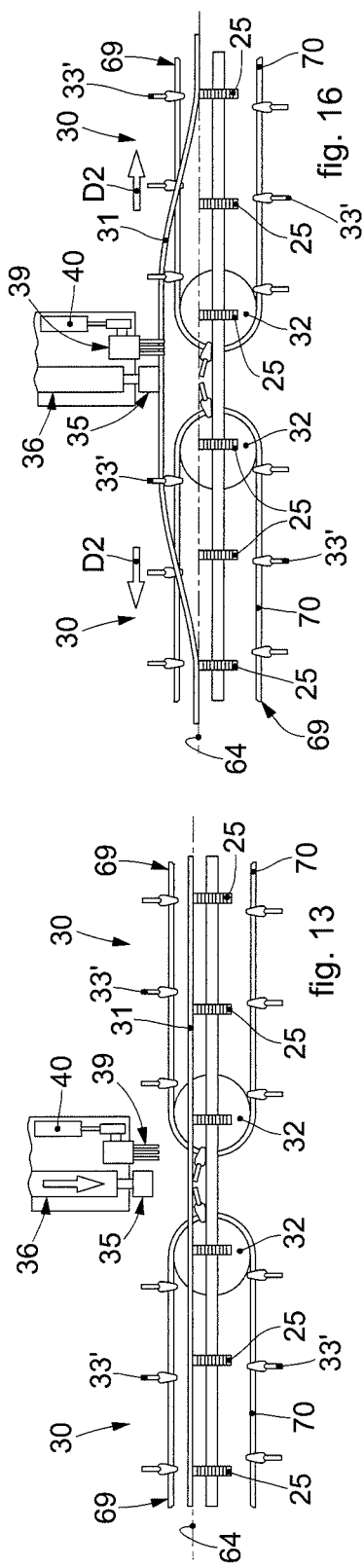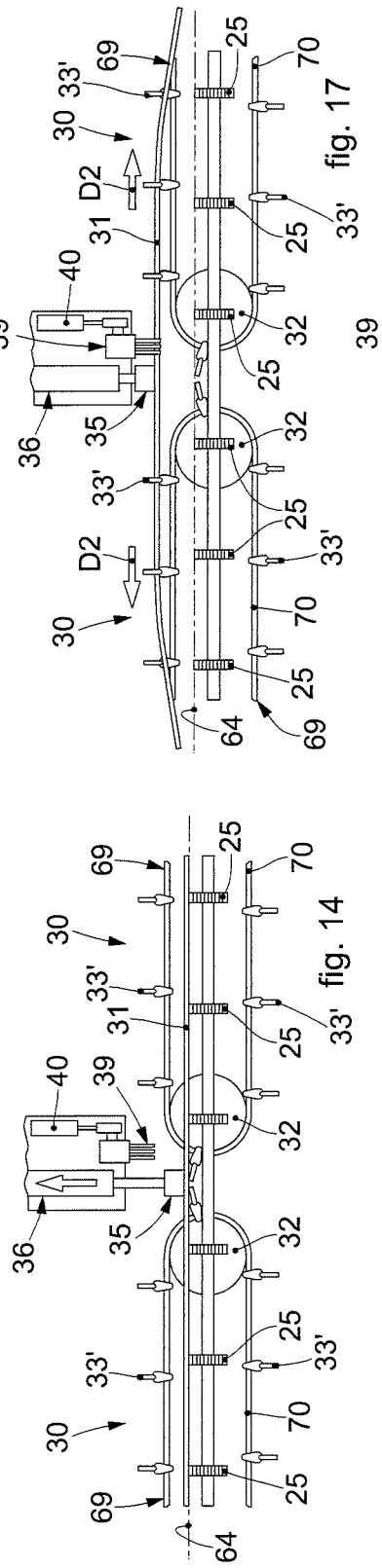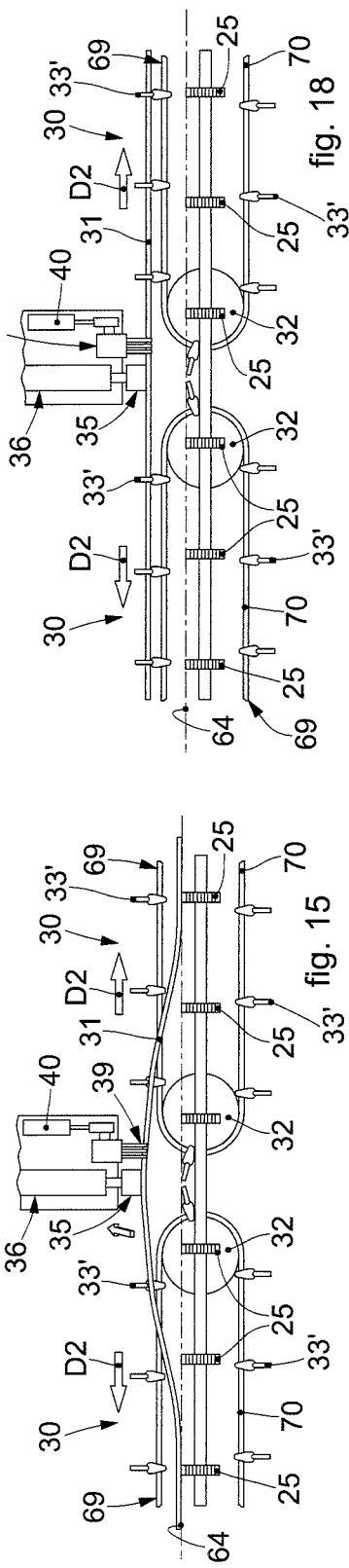

APPARATUS AND METHOD FOR HANDLING BARS

CROSS-REFERENCE TO RELATED APPLICATION

This application is a Section 371 of International Application No. PCT/EP2017/084270, filed Dec. 21, 2017, which was published in the English language on Jul. 5, 2018, under International Publication No. WO 2018/122132 A1, which claims priority under 35 U.S.C. § 119(b) to Italian Application No. 102016000132141, filed Dec. 29, 2016, the disclosures of which are incorporated herein by reference in their entirety.

FIELD OF THE INVENTION

The present invention concerns an apparatus and a method for handling bars, in particular metal bars.

The term bars includes oblong shaped products such as, for example, rods, reinforcement rods, bars, round pieces, square bars or suchlike. The bars can therefore be used, for example, in the building trade.

The present handling apparatus and method allow, in particular, to obtain groups or subgroups of bars, as a function of the specific purposes of use of the bars and, therefore, as a function of the needs of the user who needs the bars, which, naturally, can be subjected to subsequent processing according to their specific use.

BACKGROUND OF THE INVENTION

In the field of the distribution and sale of metal bars, the need to provide a final user with metal bars in a desired and predefined number is known.

It is also known that the metal bars, generally coming from the rolling or drawing process, are supplied to the distributor in bundles of bars collected together.

The bundles of bars are subdivided by type, for example according to the sizes of the cross-section, the length, the type of material of which they are made, the shape of the cross-section or suchlike.

It is also known that the bars are extremely long, for example 6, 8, 10 or 12 meters, and when collected in bundles are entangled with each other so that it is extremely difficult to extract them from the bundle.

The operations to extract the bars and count them to be supplied to the final client are currently performed manually with extreme difficulties and risks for the operators.

It is also known to provide the final client with the number of bars required by estimating this number according to the overall weight that the bars should have.

This solution, however, is subject to errors, since the bars can have different weights from each other and such as to distort the calculated numerical estimate.

In the field of the distribution of bars the need is therefore known to perfect an apparatus that allows to supply a predefined number of bars to the final client.

In the field of mechanical processing, machines are known for processing metal bars, generally bending machines and stirrup-making machines, which work one or more bars at a time, for example to make shaped brackets for the building trade or other type of product. These machines are served by storage zones which normally have one or more containers, for example disposed on translating sliders, in which the bundles of bars are disposed and from which the bars to be sent to a certain processing are removed on each occasion.

For example, in the document WO-A-2012/120361 a device is described for removing at least one bar from a bundle of bars.

This device comprises at least one lifting unit suitable to lift at least one end segment of the bar, with respect to the bundle, and an extractor unit suitable to extract the bar from the bundle. The lifting unit comprises gripping and holding means suitable to hold, at least temporarily, the raised end segment of the bar. The extractor unit comprises a plurality of extractor elements, mobile in at least one of their operating conditions between the bundle and the raised end segment of the bar to be removed, and then progressively moved reciprocally away from both the raised end segment and also from the lifting unit in a direction substantially parallel to the longitudinal extension of the bundle and toward one end of the bar opposite the raised end segment.

This device has obvious advantages from the point of view of the automation of the extraction of at least one bar from a bundle of bars, without requiring the intervention of operators.

However, in such removal machines or devices, the bars are subsequently fed directly to a processing machine, where operations of selection and grouping of the bars in different groups or subgroups are not necessary. By selection operations we mean, for example, the counting, grouping and weighing of the metal bars.

Bar handling apparatuses are also known, for example described in documents DE-A-40.35.345 and U.S. Pat. No. 3,712,458, which comprise a plane to feed the bars toward a selector unit. The selector unit is configured to individually remove one bar at a time and supply it to a collection station, where an assembly of a predefined number of bars is formed.

The selector unit is provided with a detection device provided to detect the number of bars that are delivered to the collection station.

In DE-A-40.35.345, the selector unit is provided with a toothed wheel, or a toothed belt, the teeth of which are suitably configured to receive and transport one bar at a time from the feed plane to the collection station. This solution, however, is not very efficient especially for bars having great lengths and limited diameters. In fact, these types of bars often arrive on the feed plane entangled and crossed over one another. In this situation the teeth of the selector unit are not able to receive the bars, or at times lose their grip on the latter during transport.

In U.S. Pat. No. 3,712,458 the selector unit is provided with a plurality of shaped plates located adjacent to each other and provided, on a longitudinal edge thereof, with a plurality of seatings to receive the bars.

The shaped plates are connected to an actuation unit, provided to move the plates in an eccentric manner and according to a predefined sequence suitable to determine the feed of the bars from one seating to the next.

Even this solution, however, does not ensure a correct feed of the bars from the feed plane to the collection station, since in this case too some bars may not be correctly retained in the reception seatings.

Both the known solutions described above are, moreover, complex to carry out and often subject to blockages of the bars.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore a need to provide an apparatus and a method for handling bars, in particular metal bars, which can overcome at least one of the disadvantages of the state of the art.

One purpose of the present invention is therefore to obtain an apparatus for handling bars, in particular metal bars, which automatically selects one or more bars from a given pack or initial bundle of bars loaded into the apparatus, so as to obtain one or more groups or assemblies of metal bars, according to the needs of the user of said metal bars.

Another purpose of the present invention is to provide an apparatus for handling bars, in particular metal bars, which advantageously eliminates or at least limits manual operations and automates the process of removing, selecting and grouping the metal bars.

Another purpose of the present invention is to provide an apparatus for handling bars, in particular metal bars, which is fast and efficient, so as to rapidly obtain groups or assemblies of bars, to be used directly or sent for subsequent processing.

Another purpose of the present invention is to provide an apparatus for handling bars, in particular metal bars, which is also able to guarantee the integrity of the bars throughout the classification and grouping process.

It is also a purpose of the invention to provide an apparatus for handling bars which ensures correct handling of the bars even if they overlap and pile up on top of each other.

Another purpose is to perfect a quick and efficient method for handling bars, in particular for removing and selecting metal bars.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes and according to a first aspect of the invention, an apparatus for handling bars, in particular metal bars, comprises a loading unit provided with transporter elements defining a support plane for the bars and configured to transfer the latter in a first direction transverse to the longitudinal direction of the bars and toward a selector unit.

In accordance with one aspect of the present invention, the selector unit comprises gripping means configured to take at least one portion of one or more bars and lift it with respect to the support plane. At least one detachment device is provided between the loading unit and the selector unit and comprises a plurality of arms mobile in a second direction, transverse to the first direction, to detach from the loading unit the one or more bars lifted by the gripping means and to release them toward a subsequent collection station, and also comprises sensors configured to automatically detect at least the number of bars removed and released by the gripping means toward the collection station.

According to another aspect of the invention, the selector unit comprises a gripper device associable with the gripping means and configured to hold the one or more bars removed by the gripping means.

In some embodiments of the invention, the gripping means comprise at least a mobile magnetic head.

The magnetic head can be translated toward and away from the bars by means of corresponding drive means; the magnetic head can cooperate with one or more abutment elements configured to allow the automatic release of one or more bars removed by the magnetic head.

The magnetic head can also comprise one or more housing seatings of the one or more bars removed.

According to another aspect of the invention, the collection station comprises temporary positioning means of the bars so as to form a pre-established assembly of bars.

The apparatus can also comprise a weighing unit located downstream of the collection station and configured to control the weight of the assembly of selected bars.

In some embodiments, the apparatus can comprise a bar removal unit located downstream of the weighing unit and configured to remove the assembly of bars from the weighing unit and to transfer it toward a collection store of the assemblies of selected bars.

In some embodiments, the apparatus can comprise a control unit configured to manage and process at least the count and selection data of the bars performed by the selector unit.

The invention also concerns a method for handling oblong metal bars, comprising the loading of the bars on a support plane, defined by transporter elements of a loading unit, and the transfer, with the transporter elements, of the bars in a first direction transverse to the longitudinal development of the bars, and toward a selector unit. In accordance with one aspect of the invention the method comprises the gripping and the lifting, with respect to the support plane, of at least one portion of one or more bars by gripping means of the selector unit, and the detachment, from the loading unit, of the one or more bars lifted by the gripping means by a movement in a second direction, transverse to the first direction, of a plurality of anus that contact said one or more bars and release them toward a subsequent collection station. The method also comprises the detection of the number of bars removed and released by the gripping means toward the collection station.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the specification or in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein:

FIGS. 13-18 are front schematic views of a detail of the apparatus in FIG. 12, in different operating conditions;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We shall now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all the modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
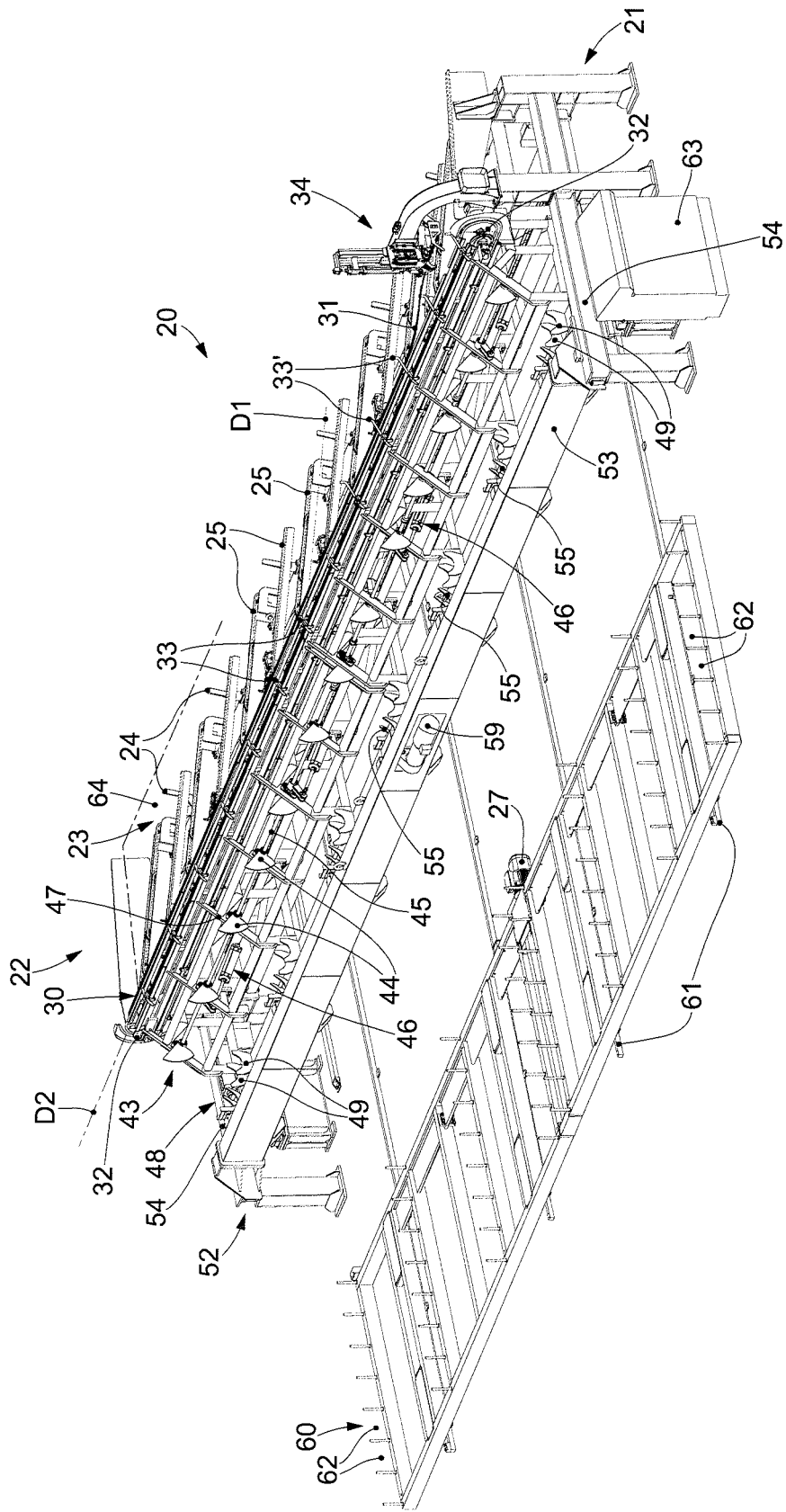
FIG. 1 is a three-dimensional view of an apparatus for handling bars, in particular metal bars, according to the invention.
Figure 2:
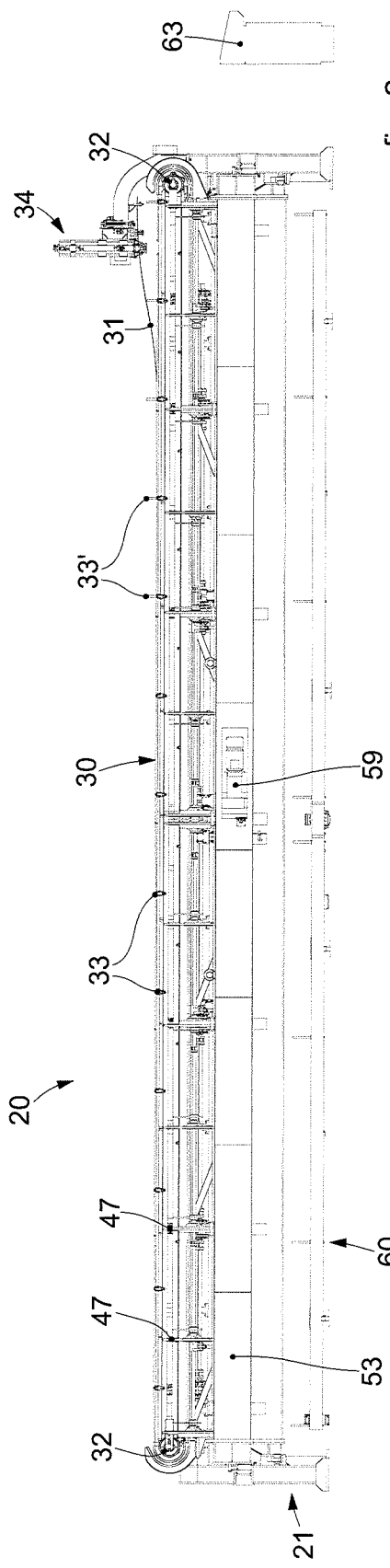
FIG. 2 is a front view of the present apparatus for handling bars.
Figure 3:
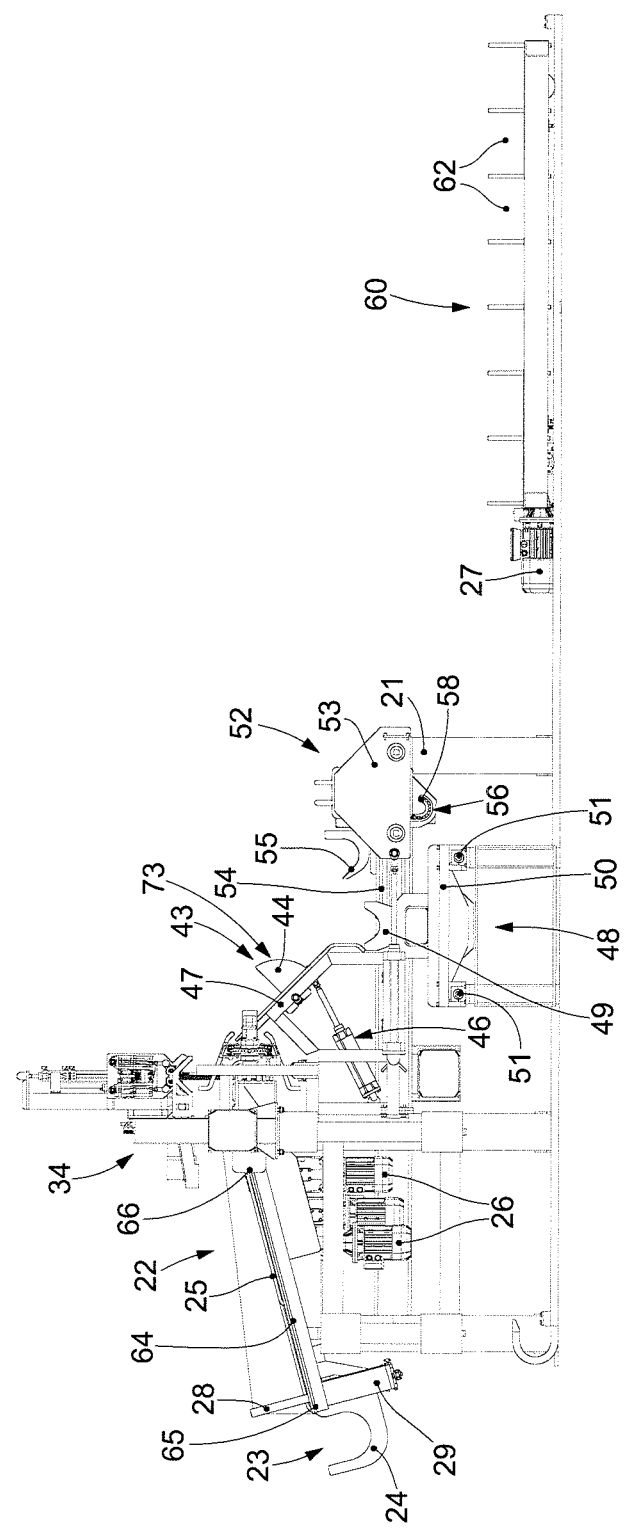
FIG. 3 is a lateral elevation view of the present apparatus.

With reference to the attached drawings, see FIGS. 1-3 for example, an apparatus 20 for handling bars 31, in particular metal bars, according to the invention, comprises a loading unit 22 on which a bundle of bars 31 is poured, in particular metal bars, for example by means of a bridge crane or suchlike.

The loading unit 22 can comprise a zone 23 to unload the excess bars 31.

The loading unit 22 can be located substantially horizontal (FIG. 12) or inclined toward the unloading zone 23 (FIG. 3).

The unloading zone 23 can comprise, for example, a series of cradles 24 for housing the excess bars 31 coming from the loading unit 22. The cradles 24 can be located adjacent to each other and aligned in a direction parallel to the oblong development of the bars 31.

The loading unit 22 comprises a series of transporter elements 25 to transport the bars 31, defining a support plane 64 for the bars 31. The support plane 64 can be horizontal or inclined.

The loading unit 22, or the support plane 64, is provided with a first longitudinal edge 65 and a second longitudinal edge 66 opposite to the first longitudinal edge 65, and both located, during use, parallel to the longitudinal development of the bars 31.

The unloading zone 23 is located in correspondence with the first end edge 65.

The unloading zone 23 is located at least partly below the support plane 64.

The transporter elements 25 are configured to transfer the bars 31 in a first direction D1 which is located substantially transverse to the longitudinal development of the bars 31, and parallel to the support plane 64.

The transporter elements 25 are disposed parallel to each other, in a direction parallel to the first direction D1, and provided with corresponding drive means 26 (FIG. 3).

The transporter elements 25 can comprise, for example, a plurality of chains disposed parallel to each other, and returned around rolls made to rotate by means of said drive means 26.

The transporter elements 25 are used both to scatter the bars 31 discharged onto the loading group 22, for example by means of an alternating movement, and also to move the scattered bars 31 toward a selector unit 34, configured, as we will see, to remove and release one or more bars 31.

According to a possible solution, the selector unit 34 is installed, at least in its operating condition, above the support plane 64.

The selector unit 34 can be positioned in correspondence with the second longitudinal edge 66 of the support plane 64.

The transporter elements 25 can be configured to transfer the bars 31 toward the unloading zone 23.

The loading unit 22 can be provided, upstream of the unloading zone 23, with a series of pins 28 provided to keep the bars 31 on the loading unit 22, and to prevent the bars 31 just discharged onto the loading unit 22 from slipping immediately into the unloading zone 23.

Figure 12:
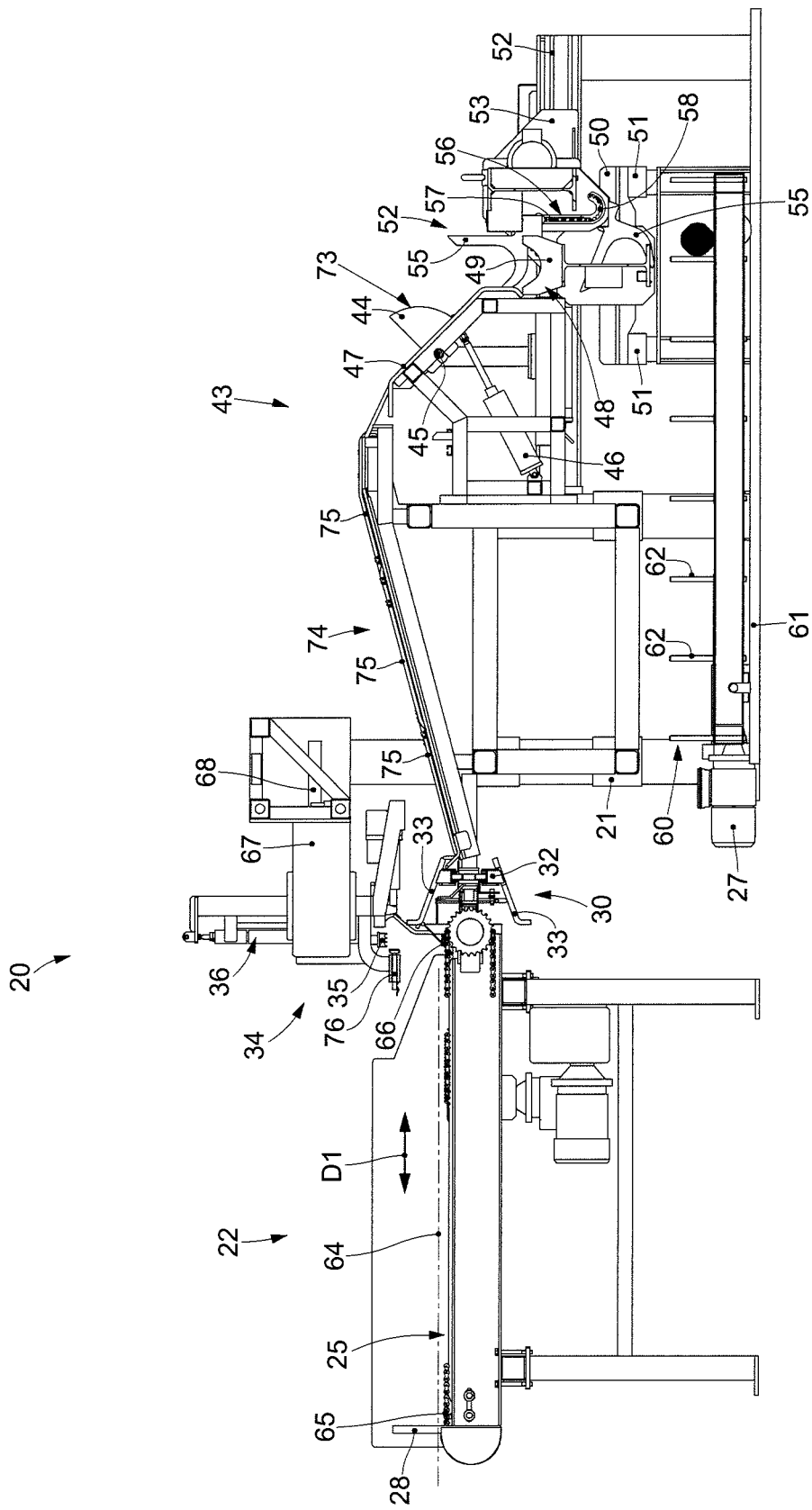
FIG. 12 is a lateral view, partly in section, of a possible variant embodiment of FIG. 2.
Figure 19:
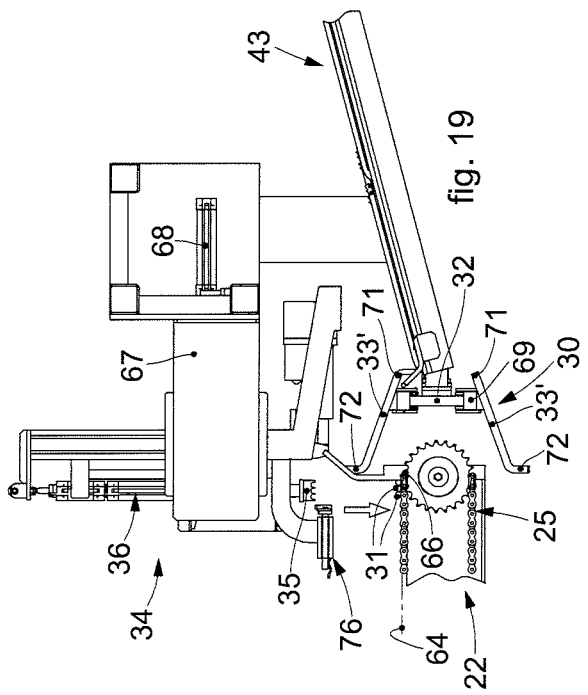
FIGS. 19-22 are front schematic views of a detail of FIG. 12, in different operating conditions of the apparatus.

The loading unit 22, however, could comprise, as an alternative and as shown in FIG. 12, transporter elements 25 positioned on a substantially horizontal plane.

The pins 28 can be positioned according to an orientation incident with the support plane 64.

Each of the pins 28 can comprise, for example, an actuator 29 configured to lower and lift the pin 28 with respect to the support plane 64. In particular, when the pin 28 is in a raised position, or protruding with respect to the support plane 64, the bars 31 are guaranteed to be kept on the loading unit 22, whereas if the pin 28 is in the lowered position, or is retracted with respect to the support plane 64, the bars 31 can be moved toward the unloading zone 23, in order to unload the bars 31.

According to one aspect of the present invention, the selector unit 34 comprises gripping means 35 configured to take at least one portion of one or more bars 31 and at least to lift it with respect to the support plane 64.

Figure 4:
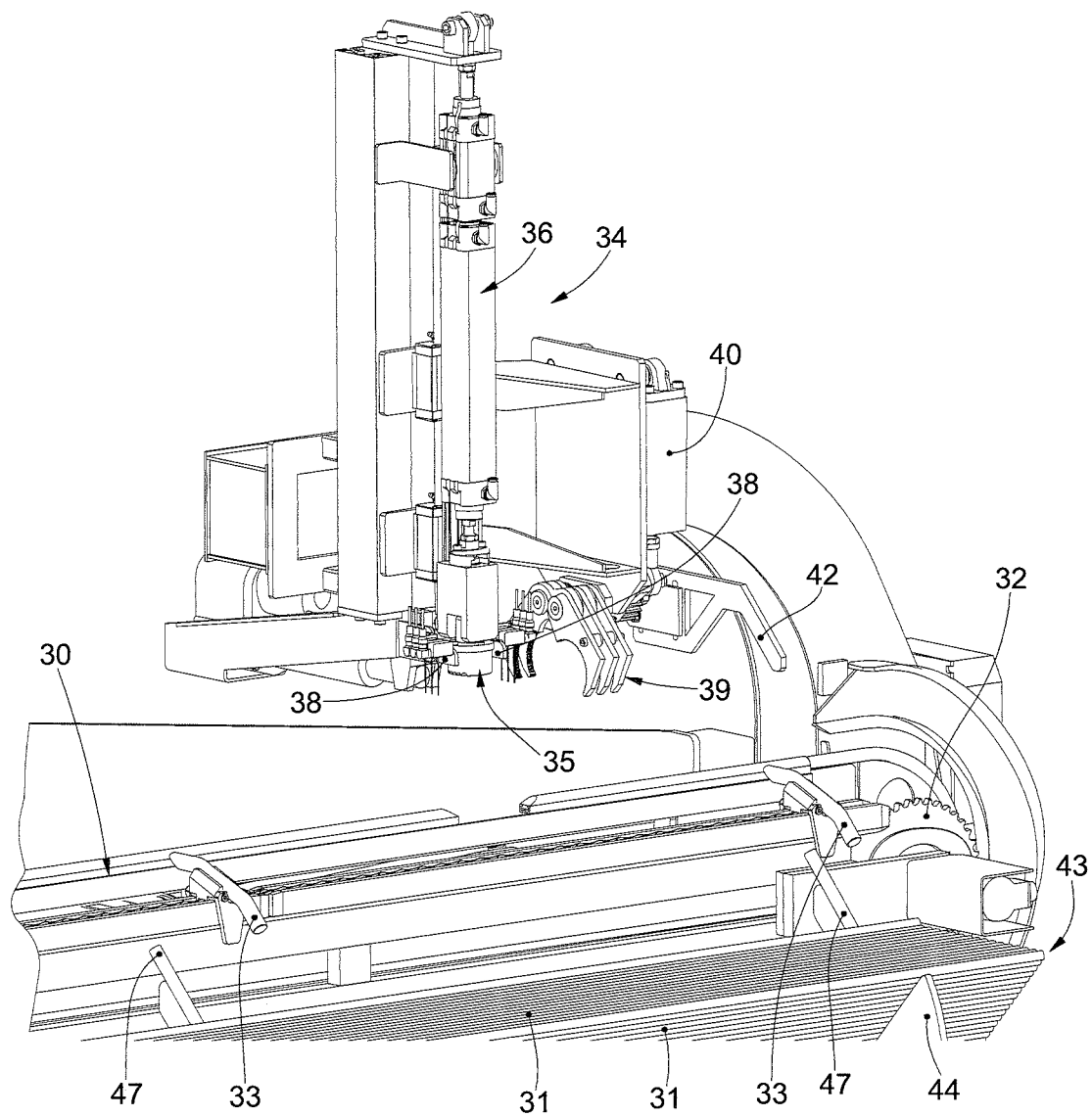
FIG. 4 is a three-dimensional view of a selector unit for one or more bars.

In accordance with the embodiment shown in FIGS. 1 and 4, the selector unit 34 is positioned at one end of the apparatus 20, or at one end of the second longitudinal edge 66 of the support plane 64. In accordance with this embodiment, the selector unit 34 is configured to take and lift an end portion of the bar or bars 31.

According to a variant embodiment (FIGS. 12-22), the selector unit 34 is positioned in an intermediate zone of the length of the support plane 64, or of the length of the second longitudinal edge 66. In accordance with this embodiment, the selector unit 34 is configured to take and lift an intermediate portion of the bar or bars 31.

The gripping means 35 can be associated with drive means 36 configured to move the gripping means 35 between a removal position in which they are located substantially aligned with the support plane 64, to allow the removal of the bars, and a lifting position, in which the gripping means 35 are kept above the support plane 64 and keep the removed portion of bar 31 raised.

The gripping means 35 can comprise, for example, at least one magnetic head which can be translated upward or downward by the drive means 36. The drive means 36 can comprise, for example, a linear actuator the shaft of which can be associated with the gripping means 35.

The selector unit 34 could also provide a magnetic type handling device such as that described in the international application PCT/EP2017/064239.

The gripping means 35 of the selector unit 34 could also be of a mechanical or electromechanical nature.

Hereafter, the description will refer, by way of non-restrictive example, to the case in which the gripping means comprise the magnetic head 35 shown.

Figure 4A:
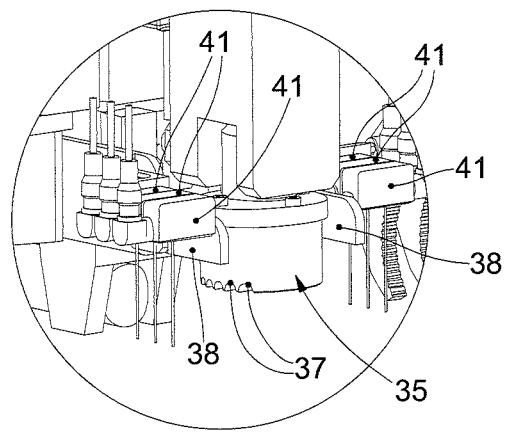
FIG. 4a is an enlarged scale view showing a magnetic head of the selector unit.

The magnetic head 35 is provided with a plurality of housing seatings 37 each of which is provided to receive and retain a corresponding bar 31 (FIG. 4a).

The seatings 37 can have a size suitable to allow the housing of a single bar 31, that is, they can have a width substantially equal to the diameter of the bar 31.

As we will see, depending on the settings supplied to the apparatus 20, for example to a control unit 63 of the apparatus 20, and depending on the number of bars 31 to be removed, any number of seatings 37 can be used, from one to all the seatings 37.

According to a possible solution, the magnetic head 35, on one or two opposite sides thereof, comprises at least one abutment element 38, which can be fixed or mobile with respect to the magnetic head 35, so as to allow contact with one or more bars 31 housed in the gripping means, for example in the seatings 37.

The abutment surface of the abutment element 38 can be located on a plane corresponding substantially to the positioning plane of the seatings 37, when the gripping means are in their lifting position.

In particular, by suitably positioning the abutment element 38, it is possible to take only some of the bars 31 in cooperation with the abutment element 38, while the others are free. By lifting the magnetic head 35, the bars 31 in cooperation with the abutment element 38 due to mechanical interference will be released by the magnetic head 35, while the other bars 31 will be held gripped and subsequently released toward a station downstream, as described below.

According to a possible embodiment (FIGS. 12 and 19-22), the gripping means 35 can comprise a selector member 76 configured to remove the bars 31 not inserted in the seatings 37 from the gripping means.

By way of example only, if the magnetic head 35 retains, by magnetic action, the bars 31 in a position outside the seatings 37, the selector member 76 removes them.

The selector member 76 can comprise a bracket mobile linearly on a plane corresponding to the positioning plane of the apertures of the seatings 37. The interference of the mobile bracket with the bars 31 not contained in the seatings 37 determines the removal of the latter by the magnetic head 35, preventing unwanted transfer of the latter.

The selector unit 34 also comprises a gripper device 39, driven open and closed by means of corresponding drive means 40.

The gripper device 39 has the function of holding and firmly clamping the bars 31 initially removed by the magnetic head 35. In order to count how many bars 31 are removed by the magnetic head 35, or by the gripping means of the selector unit 34, in the proximity of the magnetic head 35 sensors 41 are positioned, for example laser sensors, photocells or suchlike.

In order to be able to count every single bar 31 it is possible to provide that each of the sensors 41 is associated with a corresponding seating 37 to house the bar 31.

If, as in this case, see FIG. 4a again, the sensors 41 are disposed on both sides of the magnetic head 35, the sensors 41 will be positioned so that, for example, in the case of a first seating 37 adjacent to a second seating 37, the sensor 41 of the first seating 37 is located on one side of the magnetic head 35 and the sensor 41 of the second seating 37 is located on the other side of the magnetic head 35.

The selector unit 34 can also comprise a contrast element 42 which cooperates in ensuring the correct positioning of the bar or bars 31 removed by the selector unit 34.

According to a possible embodiment (FIGS. 12 and 19-22), the gripping means 35 can be installed on a slider 67 mobile in a direction parallel to the first direction D1 to take the gripping means 35 from a position above the loading plane 64 to a translated position and above a detachment device 30 as described below.

The loading unit 22 is located in succession and aligned with the detachment device 30 in the first direction D1.

In particular, it can be provided that the detachment device 30 is positioned at the second longitudinal edge of the support plane 64.

An actuator 68 configured to take the slider 67 into the two positions can be connected to the slider 67.

With the detachment device 30 it is possible to detach a bar or a plurality of bars 31 among those taken by the transporter elements 25 substantially in proximity to the selector unit 34.

According to one aspect of the invention, the detachment device 30 comprises a plurality of arms 33' mobile in a second direction D2, transverse to the first direction D1, to detach from the loading unit 22 the one or more bars 31 lifted by the gripping means 35 and to release them toward a subsequent collection station 43.

According to one embodiment of the invention, in the second direction D2, the detachment device 30 is positioned between the loading unit 22 and the selector unit 34.

According to possible embodiments, the arms 33' can be positioned, at least in their operating condition for extracting the bars 31, above the support plane 64.

At least some of the arms 33', in their extraction condition, are located aligned and reciprocally distanced in the second direction D2.

The detachment device 30 can comprise motion transmission elements 69 provided to move the arms 33' in the second direction D2.

The motion transmission elements 69 can be located substantially aligned in the second direction D2.

The motion transmission elements 69 can comprise a chain 70, or belt, or cable, wound annularly around at least one pair of return rolls 32. At least one of the rolls 32 is associated with means to drive the motion transmission elements.

The chain 70 defines a first return segment which puts the arms 33' above the support plane 64 and in a position suitable to extract or detach the bars 31, and a second return segment which puts the arms 33' under the support plane 64.

According to a variant embodiment, the motion transmission elements can comprise a linear actuator linearly mobile and supporting the arms 33'.

According to a first embodiment (FIGS. 1-11), the apparatus 20 comprises a single detachment device 30 which extends substantially for the entire length of the support plane 64, or for the entire length of the second longitudinal edge 66.

In this case the arms 33' are mobile in the second direction D2 and with a sense away from the gripping means 35, which are located in correspondence with one end of the second longitudinal edge 66.

In some embodiments it can be provided that the arms 33' are mobile from a first end of the second longitudinal edge 66 toward the opposite end.

According to a variant embodiment (FIGS. 12-22), the apparatus 20 comprises two detachment devices 30 located, with respect to the first direction D1, on one side and on the other side of the gripping means 35 and parallel to the second longitudinal edge 66 of the support plan 64.

According to this embodiment, the gripping means 35 are located in an intermediate position of the length of the second longitudinal edge 66 of the support plane 64.

The arms 33' of the two detachment devices 30, moreover, can be mobile in the second direction D2, both according to a sense away from the gripping means 35. In particular, it is provided that the arms 33' of a first detachment device 30 are mobile in an opposite sense with respect to the arms 33' of the second detachment device 30 as shown in FIGS. 15-18.

According to possible solutions (FIGS. 5-7 and FIGS. 19-22), the arms 33' can have a hooked shape, with a first end portion 71 attached to the motion transmission element 69, and a second end portion 72, free and which, during use, contacts the bars 31 to determine their extraction.

In accordance with the embodiments shown in FIGS. 1-11, and in the case where the gripping means 35 are fixed and located above the support plane 64, at least the second end portion 72 of the arms 33' overlaps the support plane 64 in order to intercept the portions of bar 31 which are lifted by the gripping means 35, and to determine their subsequent extraction.

In accordance with this solution, the detachment device 30 can comprise diversion arms 33 (FIG. 4), installed on a first longitudinal segment of the detachment device 30 and configured to divert the bars 31 toward the collection station 43.

In accordance with this solution, it can be provided that the arms 33' are installed on a second longitudinal segment of the detachment device 30, which is consecutive to the first longitudinal segment.

The arms 33 and 33' can advantageously be inclined toward a zone where the bars 31 are unloaded from the selector unit 34.

Although in the attached drawings the apparatus 20 comprises only one collection station 43, it is not excluded that in possible variant embodiments the apparatus 10 comprises two or more collection stations 43 disposed one in succession to the other and each of them configured to receive the bars 31 supplied by the selector unit 34.

The collection stations 43 (FIGS. 1-11) can act as temporary collection zones for the bundles of bars 31, for example to allow their subsequent supply downstream in relation to the temporal requirements of the devices located downstream.

The collection station 43 can comprise temporary positioning means 73 for the bars 31, provided for example with mobile brackets 44.

The mobile brackets 44 can be associated with a shaft 45, able to be rotated by one or more drive means 46.

The mobile brackets 44 are positioned at a certain height of a series of sliding elements 47 that move the bars 31.

The sliding elements 47 can be, for example, rods provided with a suitable inclination facing toward a weighing unit 48 of the bars 31.

The inclination of the sliding elements 47 is substantially opposite to the inclination of the transporter elements 25 of the loading unit 22.

In particular, the drive means 46 are configured to take the mobile brackets 44 into a protruding condition with respect to a plane defined by the sliding elements 47, to temporarily retain the bars 31, and a retracted condition with respect to said plane in order to allow the unloading of the bars 31.

According to a possible variant embodiment, shown in FIGS. 12-22, the collection station 43 can also comprise a transfer device 74 interposed between the detachment devices 30 and the temporary positioning means 73 and configured to transfer the bars 31 received from the detachment devices 30, toward the temporary positioning means 73.

The transfer device 74 can comprise a plurality of transmission elements 75, for example, chains wound in a closed loop, configured to transfer the bars 31 in a direction parallel to the first direction D1.

According to a possible solution, the transmission elements 75 define a plane to move the bars 31 which is inclined upward, and toward the temporary positioning means 73.

The transfer device 74 can define, for example, a temporary accumulation of the bars 31 to allow, for example, the completion of manual operations carried out by the operators downstream of the collection station 43, for example after the weighing unit 48.

The weighing unit 48 can comprise a series of cradles 49 to house the bars 31. The cradles 49 can be positioned on a support 50 associated with load cells 51, able to weigh the bars 31.

Downstream of the weighing unit 48, the present apparatus 20 comprises a removal unit 52, configured to remove the bars 31 from the weighing unit 48.

The removal unit 52 is provided with a slider 53 which can be translated two-directionally along suitable fixed guides 54. The slider 53, in order to carry out the translation in one direction or the other, is associated with corresponding drive means.

In some embodiments, the slider 53 comprises a series of arms 55 to remove the bars 31 from the weighing unit 48. The arms 55 to remove the bars 31 are in an offset position with respect to the cradles 49, so that they can remove the bars 31 from the cradles 49 without interfering with them.

Figure 7:
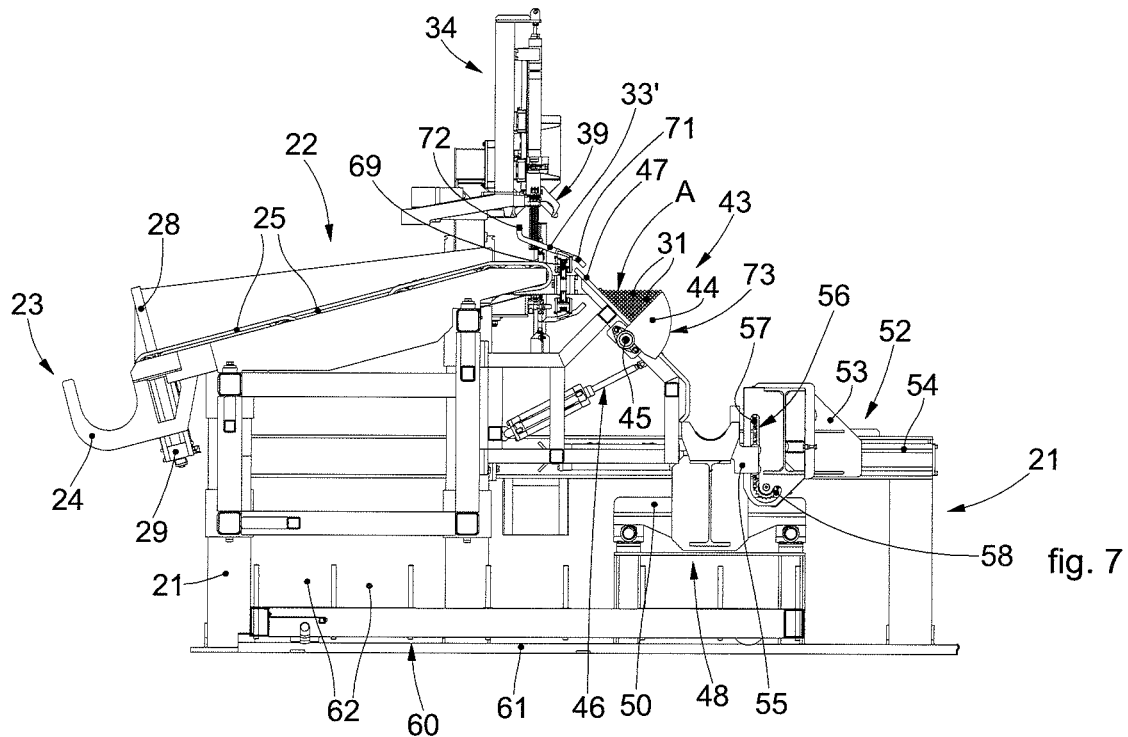
FIG. 7 is another lateral elevation view of the present apparatus, for example at the end of the selection step of the metal bars.

The removal arms 55 can be associated with sliding guides 56, see FIG. 7 for example, which have a first substantially linear segment 57 to lift or lower the arms 55, and a second curved segment 58 to overturn the arms 55.

The sliding of the arms 55 along the guides 56 is carried out by means of corresponding drive means 59, preferably housed in the slider 53.

Downstream of the removal unit 52, the present apparatus 20 comprises a store 60 to collect the bars 31 removed.

The store 60 is mobile and is positioned on corresponding sliding guides 61 resting on the ground.

The sliding guides 61 are able to allow a translation of the store 60 under a support structure 21 of the present apparatus 20, as clearly visible in FIG. 1.

The positioning of the store 60 below the structure 21 allows to optimize the spaces and to deliver the assembly of bars 31 in any zone whatsoever of the store 60 itself.

The store 60 is translated along the sliding guides 61 by means of corresponding drive means 27.

The store 60 is divided into a plurality of boxes or sectors 62 in which to place a group of bars 31, taken from the removal unit 52.

In particular, it can be provided that each sector 62 is associated with a specific client for whom the bars 31 are intended.

In accordance with some embodiments, the control unit 63 can be connected at least to the drive means 27 in order to move the store 60 in a controlled manner and define a precise positioning of a given sector 62, for example in correspondence with the unloading zone of the removal unit 52.

The functioning of the apparatus 20, of which an example is shown below, is managed by the control unit 63, which an operator can access in order to manage and control the various operations, see from FIG. 4 to FIG. 11 for example.

A pack or bundle of bars 31, in particular metal bars, is positioned by means of a bridge crane or suchlike on the transporter elements 25 of the loading unit 22.

The transporter elements 25 therefore receive a quantity of bars 31 to be transferred, in a scattered manner, toward the selector unit 34.

To prevent the bars 31, in this step, from sliding into the unloading zone 23, or falling from the support plane 25, the pins 28 located near the lower end of the loading unit 22 are suitably lifted by the actuators 29.

The magnetic head, or the gripping means 35 (FIGS. 14, 20) are lowered by means of the corresponding drive means 36, so as to be able to remove the plurality of bars 31 from the loading unit 22.

Each bar 31 will be housed and held in a corresponding seating 37 of the magnetic head 35. For each seating 37 a sensor 41 is provided, as we said, which detects the presence of the bar 31: by means of the sensors 41, it is ultimately possible to count the bars 31 removed and to communicate the number to the control unit 63.

In the step of removing the bars 31 by the magnetic head 35 and housing them in the seatings 37, the gripper device 39 is in the open position, as for example in FIG. 4.

Figure 5:
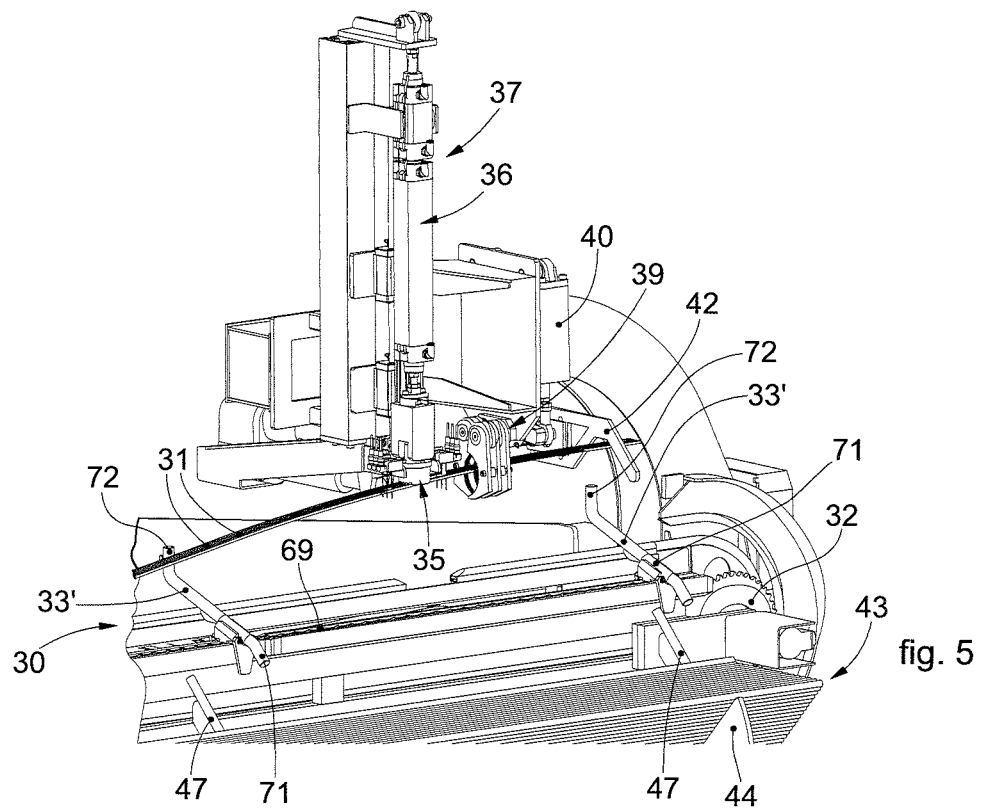
FIG. 5 is a three-dimensional view of the selector unit in a certain operating step.
Figure 21:
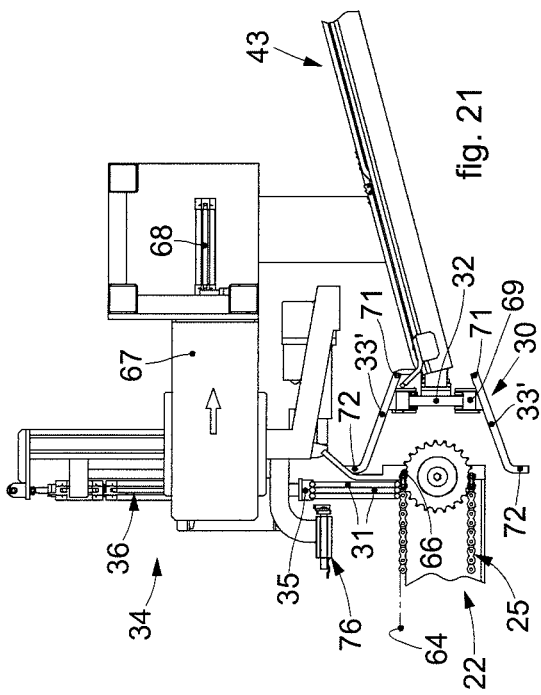

Once the magnetic head 35 has removed the bars 31, the latter is lifted by means of the drive means 36, so as to take the bars 31 substantially to the height of the gripper device 39, see FIGS. 5, 15, 21. At this point the gripper device 39, by means of the corresponding drive means 40, is partly closed (FIG. 5).

Figure 6:
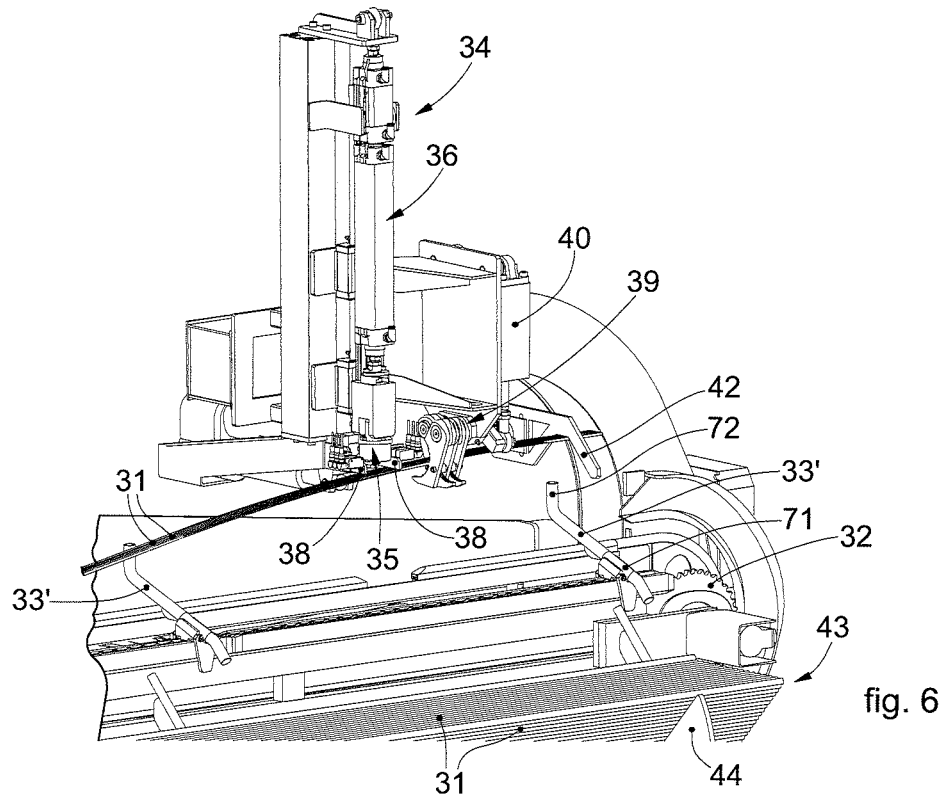
FIG. 6 is a three-dimensional view of the selector unit in an operating step subsequent to the operating step in FIG. 5.

The gripper device 39 is completely closed and the magnetic head 35 is further lifted, see FIG. 6, so that the bars 31 removed go against the abutment elements 38. In this way, the bars 31 are separated from the magnetic head 35 and clamped by the gripper device 39.

As we said, it is possible to provide that the abutment elements 38 can be positioned with respect to the bars 31 present in the seatings 37 of the magnetic head 35. In this way, when the magnetic head 35 is lifted, some of the bars 31 present in the seatings 37 abut against the abutment elements 38 and are released directly into the loading unit 22 for a subsequent removal.

Other bars 31, not taken into cooperation with the abutment elements 38, remain gripped in the magnetic head 35 and can subsequently be retained by the gripper device 39.

The gripper device 39 thus keeps the end portions raised (FIG. 6), or intermediate portions (FIGS. 15 and 21) of the bars 31 removed from the magnetic head 35, while the remaining part of the bar 31 is still located in the loading unit 22.

In this condition the detachment device 30 is actuated, configured to detach the bars 31 on the loading unit 22 and transfer them to the collection station 43.

In accordance with the embodiment shown in FIGS. 2, 4, 4a, 5 and 6, by driving the motion transmission elements 69 it is possible to take the hook-shaped arms 33' to a position included between the transporter element 25, that is, the support plane 64 and the raised ends of the bars 31.

The arms 33' are moved along the longitudinal extension of the motion transmission elements, coming into contact with the remaining part of the bars 31 which are still in the loading unit 22. The arms 33' therefore exert an action of detaching the bars 31 from the loading group 22 to take them toward the collection station 43.

In the example shown, it is assumed that, by means of the selector unit 34, a plurality of bars 31 are detached and subsequently removed, but naturally, it could be provided to detach and remove a single bar 31.

The detachment action is carried out with the bars 31 clamped by the gripper device 39, so that the action of detaching the bars 31 does not also cause a movement along the longitudinal extension of the bars 31.

When the gripper device 39 is opened, see FIG. 7, the bars 31 removed slide along the arms 33' and along the sliding elements 47 until they reach the mobile brackets 44 for the temporary positioning of the bars 31.

Figure 20:
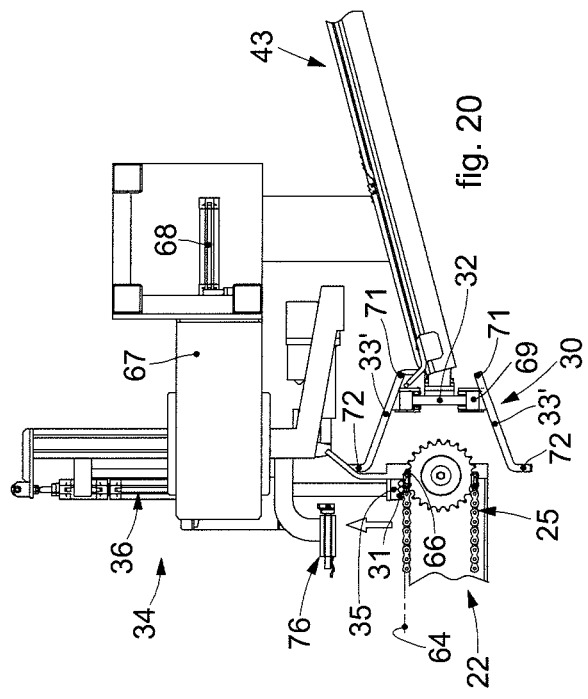

In accordance with the embodiment shown in FIGS. 16-18 and 22, the gripping means 35 remove and lift from the loading plane 64 intermediate portions of the bars 31 (FIGS. 20, 21). The gripping means 35 (FIGS. 21 and 22) are translated with the slider 67 in a direction parallel to the first direction D1.

Figure 22:
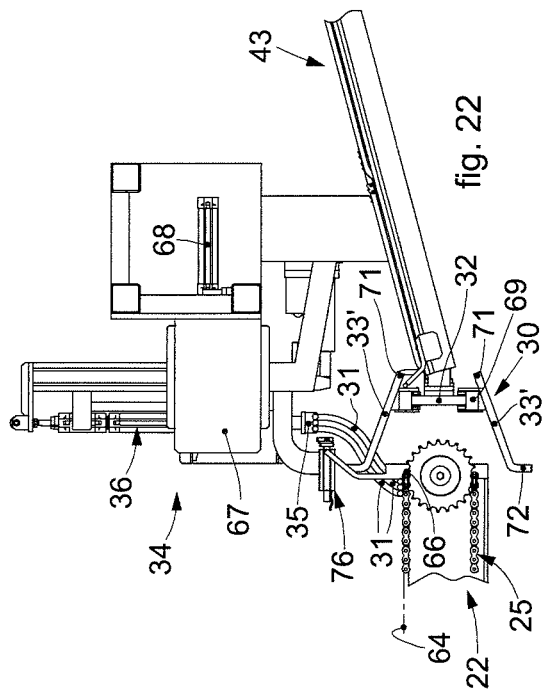

In this way, the gripping means 35 are positioned outside the plan bulk of the loading plane 64 and above the two detachment devices 30 (FIG. 22).

In this condition, both the detachment devices 30 are driven to start the extraction of the bars 31 lifted by the gripping means 35.

In particular, each detachment device 30 detaches and transfers a respective half of the longitudinal extension of the bars 31, to transfer them toward the collection station (FIGS. 16-18).

When the bars 31 have been completely detached from the loading unit 22, they can be unloaded onto the transfer device 74 and subsequently transferred toward the temporary positioning means 73.

In accordance with the embodiments shown in the drawings, the bars 31 can be unloaded onto the mobile brackets 44 of the collection station 43 until an assembly A of bars 31 of a predefined number is obtained, for example based on the request of a final user.

The assembly A therefore represents a subgroup of the initial bundle or pack of bars 31 initially poured into the loading unit 22.

In essence, the selector unit 34 can operate several times until the desired number of bars 31 is reached, so as to form the assembly A. Then the operation of removing bars 31 from the detachment device 30, or directly from the loading unit 22, and the subsequent release by means of the gripper device 39, continues until the desired number of bars 31 for assembly A is reached. Naturally, a single removal operation by the selector unit 34 could also be sufficient or, on the contrary, several removal operations could be necessary.

When, by means of the sensors 41, it is established that the assembly A comprises the desired number of bars 31, the control unit 63 commands the drive means 46 of the mobile brackets 44 so that they rotate and allow the assembly A of bars 31 to pass from the collection station 43 to the weighing unit 48, by sliding further along the sliding elements 47. In practice, in the example shown, the mobile brackets 44 will be rotated downward by about 90°.

In this step and with reference to FIGS. 1-11, the pins 28 can also be retracted by means of the corresponding actuators 29 and therefore the bars 31 which are left over from the selection operation can be made to slide along the loading unit 22 as far as the unloading zone 23.

The bars 31 which will be collected on the cradles 24 of the unloading zone 23 can then be removed by means of a bridge crane or suchlike, for subsequent use on the loading unit 22 or other.

Figure 8:
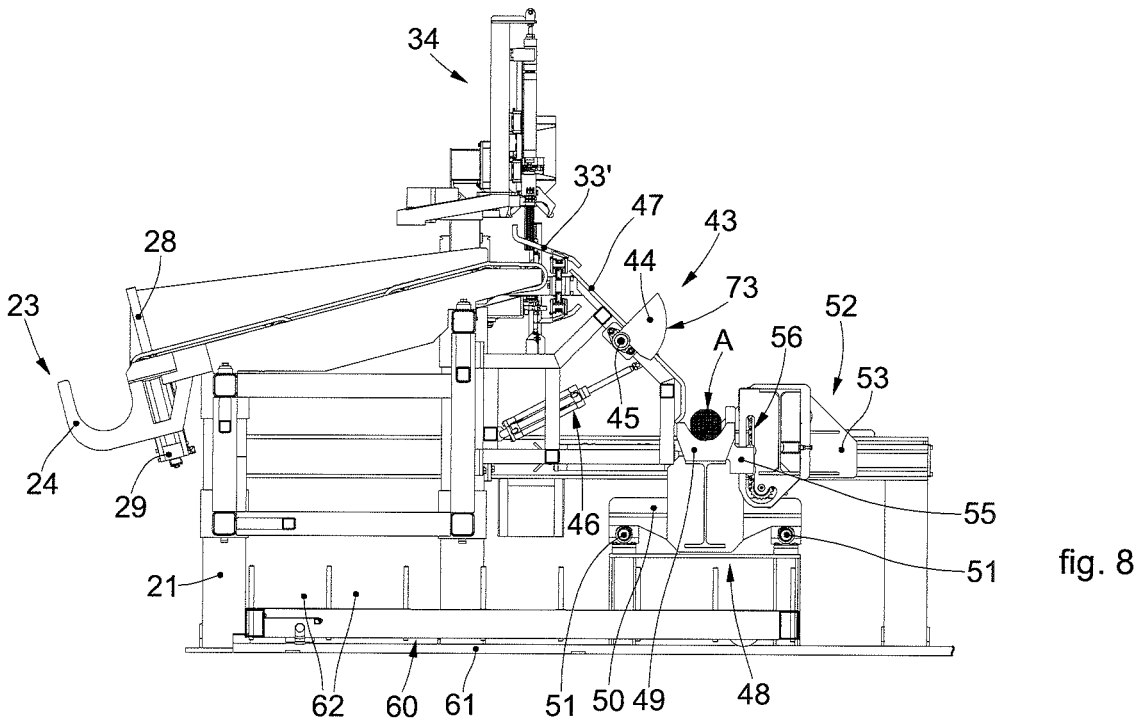
FIG. 8 is another lateral elevation view of the present apparatus, relating to the positioning of an assembly or group of bars on a weighing unit.

The assembly A is therefore located on the cradles 49 of the weighing unit 48, FIG. 8, so as to be subjected to an appropriate weighing verification, thanks, for example, to the support 50 of the cradles 49 which is associated with load cells 51.

The slider 53 of the removal unit 52 is translated along the guides 54 so as to have the anus 55 disposed in correspondence with the cradles 49.

Figure 9:
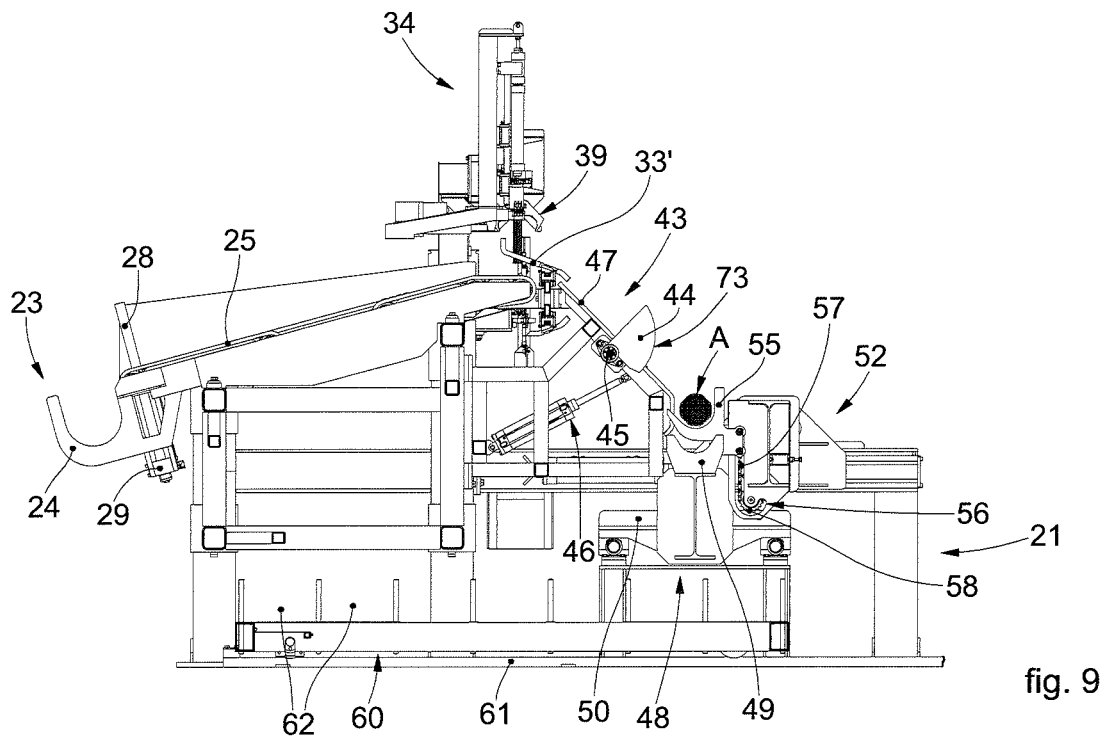
FIG. 9 is another lateral elevation view of the present apparatus, relating to a removal step of the assembly of bars from the weighing unit.

Once the weighing operation of the assembly A of bars 31 has ended, the arms 55 of the removal unit 52 are lifted by the drive means 59 along the first segment 57 of the guides 56, so that they lift the assembly A of bars 31 from the cradles 49, as in FIG. 9 for example.

Figure 10:
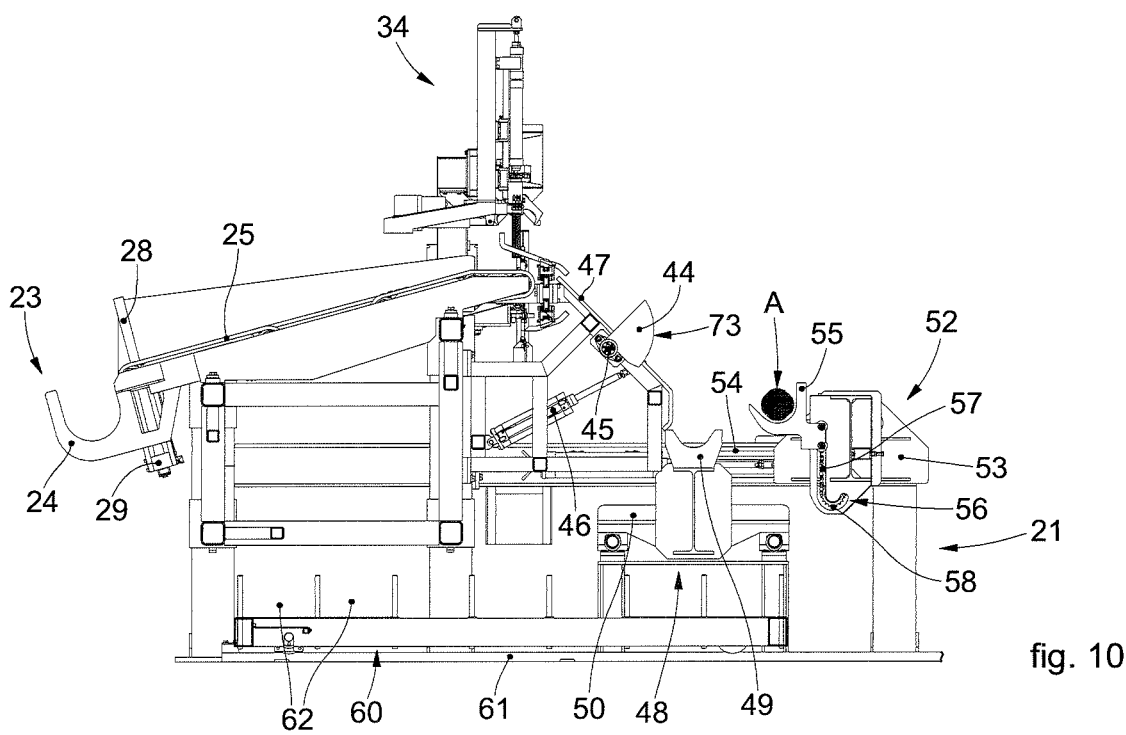
FIG. 10 is another lateral elevation view of the present apparatus, relating to another removal step of the assembly of bars from the weighing unit.

At this point the slider 53 is retracted, as in FIG. 10, so as to move the assembly A of bars 31 from the zone of the weighing unit 48.

In this condition the bars 31 on the slider 53 can be tied to each other, for example with iron bands or wires, to allow a compact bundle to be created. The operation of tying the assembly A of bars 31 can be performed manually or in an automated manner. In the latter case, the apparatus 20 for handling bars 31 is provided with an automated tying unit, for example installed on the slider 53, and configured to tie the bars 31 together without the intervention of operators.

Figure 11:
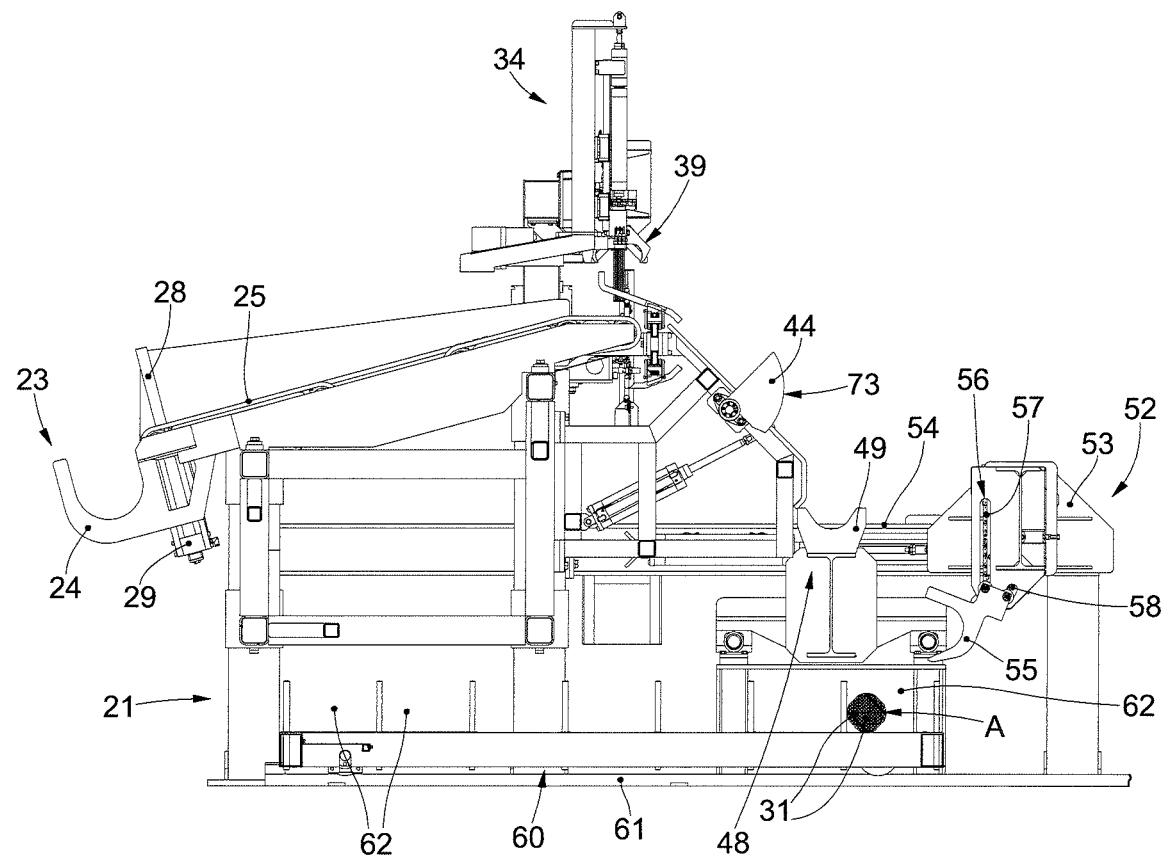
FIG. 11 is another lateral elevation view of the present apparatus, relating to a step of positioning the group of bars obtained in a mobile store.

The assembly of bars 31 at this point is positioned in one of the sectors 62 of the store 60, FIG. 11, which has been translated under the structure 21 of the apparatus 20 by means of the corresponding drive means 27.

The positioning of the assembly A of bars 31 in one of the sectors 62, or boxes, of the store 60 is effected by rotating the arms 55 which slide along the second curved segment 58 of the guides 56, the that the arms 55 automatically pour the assembly A of bars 31 into the sector 62.

By translating the store 60 along the guides 61, it will be possible to take another empty sector 62 in correspondence with the arms 55 of the removal unit 52, to position a new assembly A of bars 31 in said other empty sector 62.

To speed up the operations of filling the store 60, it is possible to provide that, when a first assembly A of bars 31 is located on the cradles 49 of the weighing unit 48, a new assembly of bars 31 is already positioned on the mobile brackets 44 of the collection station 43.

When the sectors 62 in the store 60 have been occupied by the required sets of bars, which could also be only one assembly A of bars 31, it is possible to extract the store 60 from the structure 21 of the apparatus 20 by translating it along the guides 61.

It is clear that modifications and/or additions of parts can be made to the apparatus 20 and the method for handling bars 31, in particular metal bars, as described heretofore, without departing from the field and scope of the present invention.

For example it can be provided that, in a possible variant embodiment, the collection station 43 is associated with and/or integrated in the weighing unit 48, so that the selector unit 34, after counting, delivers the bars 31 directly into the weighing unit 48.

According to another variant embodiment, the assembly A of bars 31, counted by the sensors 41, can be transferred directly to the store 60, avoiding, for example, the weighing steps. In this case, therefore, the removal unit 52 can be configured to remove the assembly A of bars 31 directly from the collection station 43 and deliver it to the store 60.

It is also clear that, although the present invention has been described with reference to some specific examples, a person of skill in the art shall certainly be able to achieve many other equivalent forms of apparatus 20 and the method for handling bars 31, in particular metal bars, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Apparatus for handling oblong metal bars (31), comprising a loading unit (22) provided with transporter elements (25) defining a support plane (64) for said bars (31) and configured to transfer the latter in a first direction (D1) transverse to the longitudinal development of said bars (31) and toward a selector unit (34), wherein said selector unit (34) comprises gripping means (35) configured to take at least one portion of one or more bars (31) and to lift it with respect to said support plane (64), wherein said gripping means (35) are fixed and located above said support plane (64), wherein at least one detachment device (30) is provided between said loading unit (22) and said selector unit (34) and comprises a plurality of mobile arms (33') and motion transmission elements (69) provided to move said arms (33') in a second direction (D2), transverse to said first direction (D1), to detach from said loading unit (22) one or more bars (31) lifted by said gripping means (35) and to release them toward a subsequent collection station (43) said arms (33') being positioned, at least in their operating condition for extracting the bars (31), above said support plane (64), wherein said arms (33') have a hooked shape, with a first end portion (71) attached to the motion transmission element (69) and a second end portion (72) free and which, during use contacts the bars (31) to guide their extraction, at least said second end portion (72) overlapping said support plane (64), and said arms (33') being inclined toward the collection station (43), and wherein also comprising said apparatus comprises sensors (41) configured to automatically detect at least the number of bars (31) removed and released by said gripping means (35) toward said collection station (43).

2. Apparatus as in claim 1, wherein said support plane (64) comprises a first longitudinal edge (65) and a second longitudinal edge (66) opposite the first longitudinal edge (65), and wherein said selector unit (34) and said detachment device (30) are positioned in correspondence with the second longitudinal edge (66) of the support plane (64).

3. Apparatus as in claim 2, wherein said selector unit (34) is positioned at one end of said second longitudinal edge (66) of the support plane (64), in order to take and lift an end portion of said one or more bars (31).

4. Apparatus as in claim 2, wherein the apparatus comprises two detachment devices (30) located, with respect to said first direction (D1), on one side and the other of said gripping means (35) and parallel to said second longitudinal edge (66) of the support plane (64).

5. Apparatus as in claim 4, wherein said selector unit (34) is positioned in an intermediate zone of the length of said second longitudinal edge (66).

6. Apparatus as in claim 1, wherein the apparatus comprises a single detachment device (30) that extends for the entire length of said support plane (64).

7. Apparatus as in claim 1, wherein said gripping means (35) are installed on a slider (67) mobile in a direction parallel to said first direction (D1) in order to take said gripping means (35) from a position above said loading plane (64) to a position translated and above said detachment device (30).

8. Apparatus as in claim 1, wherein said collection station (43) comprises temporary positioning means (73) of said bars (31) so as to form at least part of an assembly (A) of bars (31).

9. Apparatus as in claim 1, wherein the apparatus comprises a weighing means (48) located downstream of said selector unit (34) and configured to control the weight of an assembly (A) of bars (31).

10. Apparatus as in claim 9, wherein said collection station (43) is located downstream of said selector unit (34) and upstream of said weighing means (48), wherein said collection station (43) comprises temporary positioning means (73) of said bars (31) so as to form at least part of an assembly (A) of bars (31), and wherein said temporary positioning means (73) of the bars (31) are configured to supply said bars (31) to said weighing means (48).

11. Apparatus as in claim 9, wherein said removal means (52) is located downstream of said weighing means (48) and upstream of said store (60) and is configured to remove said assembly (A) of bars (31) from said weighing means (48) and to deliver them to said store (60).

12. Apparatus as in claim 1, hereinbefore, wherein the apparatus comprises a store (60) located downstream of said collection station (43) and provided with a plurality of sectors (62) in each of which to position assemblies (A) of selected bars (31).

13. Apparatus as in claim 12, wherein the apparatus comprises a removal means (52) of an assembly (A) of bars (31), configured to remove said assembly (A) of bars (31) and to deliver said assembly (A) of bars (31) to one of said sectors (62) of said store (60).

14. Apparatus as in claim 1, wherein the apparatus comprises a control unit (63) connected to said sensors (41) and configured to manage and process at least the count and selection data of said bars (31) performed by said selector unit (34).

15. Apparatus as in claim 1, wherein said gripping means comprise at least a mobile magnetic head (35).

16. Apparatus as in claim 15, wherein said magnetic head (35) can be translated toward and away from the bars (31) by means of corresponding drive means (36), said magnetic head (35) being configured to cooperate with one or more abutment elements (38) configured to allow the automatic release of one or more bars (31) removed by the magnetic head (35).

17. Method for handling oblong metal bars (31), comprising:

loading said bars (31) on a support plane (64), defined by transporter elements (25) of a loading unit (22), transferring, with said transporter elements (25), said bars (31) in a first direction (D1) transverse to the longitudinal development of said bars (31), and toward a selector unit (34), gripping and lifting, with respect to said support plane (64), at least one portion of one or more bars (31) by gripping means (35) of said selector unit (34), with said gripping means (35) being fixed and located above said support plane (64), detaching, from said loading unit (22), said one or more bars (31) lifted by said gripping means (35) by a movement in a second direction (D2), transverse to said first direction (D1), of a plurality of arms (33') to release them toward a subsequent collection station (43), positioning said arms (33'), at least in their operating condition for extracting the bars (31), above said support plane (64), said arms (33') having a hooked shape, with a first end portion (71) attached to a motion transmission element (69) and a second end portion (72) free and which, during use, contact the bars (31) to guide their extraction, and at least said second end portion (72) overlapping said support plane (64), and said arms (33') being inclined toward the collection station (43), and detecting the number of bars (31) removed and released by the gripping means (35) toward the collection station (43).

* * * * *